United States Patent [19]
Andresen

[11] Patent Number: 5,204,809
[45] Date of Patent: Apr. 20, 1993

[54] H-DRIVER DC-TO-DC CONVERTER UTILIZING MUTUAL INDUCTANCE

[75] Inventor: Rolf Andresen, Tucson, Ariz.

[73] Assignee: International Business Machines Corporation, Armonk, N.Y.

[21] Appl. No.: 863,620

[22] Filed: Apr. 3, 1992

[51] Int. Cl.$^5$ .......................................... H02M 7/5387
[52] U.S. Cl. ..................... 363/132; 363/17; 363/98
[58] Field of Search ............. 363/16, 17, 98, 132, 363/124

[56] References Cited

U.S. PATENT DOCUMENTS

| | | | |
|---|---|---|---|
| H335 | 9/1987 | Milberger et al. | 363/16 |
| 3,609,452 | 9/1971 | Skirvin | 315/238 |
| 4,301,496 | 11/1981 | Schwarz | 363/17 |
| 4,408,268 | 10/1983 | Peters et al. | 363/124 |
| 4,639,849 | 1/1987 | Noworolski | 363/56 |
| 4,713,742 | 12/1987 | Parsley | 363/124 |
| 4,910,438 | 3/1990 | Farnsworth | 315/241 |
| 4,937,725 | 6/1990 | Dhyanchand et al. | 363/98 |
| 5,060,130 | 10/1991 | Steigerwald | 363/17 |
| 5,111,378 | 5/1992 | Nowak et al. | 363/98 |
| 5,132,888 | 7/1992 | Lo et al. | 363/17 |

OTHER PUBLICATIONS

IBM TDB, vol. 28, No. 11, Apr. 1986 "Voltage Regulator Having Coupled Filter for Fast Load Transient Response".
IBM TDB, vol. 23, No. 5 Oct., 1980 "DC-to-DC Power Converter".

Primary Examiner—Steven L. Stephan
Assistant Examiner—Jeffrey Sterrett
Attorney, Agent, or Firm—F. E. Anderson; H. St. Julian; M. W. Schecter

[57] ABSTRACT

Improved conversion efficiency and lower output ripple are achieved by a DC-to-DC converter that uses an H-bridge driver to alternately energize first and second inductors. By alternately energizing the first and second inductors, a higher switching frequency can be maintained allowing for the use of smaller inductors while reducing ripple in the output voltage. The reduced ripple in turn reduces the need for filtering. Additionally, the first and second inductors are wound about a common core such that a mutual inductance exists therebetween. The mutual inductance results in trapezoidal currents in each inductor instead of the typical sawtooth waveforms. This results in still lower ripple in the output voltage.

8 Claims, 3 Drawing Sheets

H-DRIVER DC-TO-DC CONVERTER UTILIZING MUTUAL INDUCTANCE

BACKGROUND OF THE INVENTION

1. Field of the Invention

This invention relates generally to the field of DC-to-DC converters and more particularly, to a DC-to-DC converter that uses an H-bridge driver as the switching device for alternately energizing two inductors wound about a common magnetic core.

2. Description of the Related Art

Electronic systems typically draw power from an AC line source. A received AC voltage is then converted to a DC voltage by an AC-to-DC converter for powering system components requiring DC voltages. Generally, many components within an electronic system require different magnitudes of DC voltages, for example, a flat panel display might require 36 volts while semiconductor integrated circuits might require 5 volts. The different DC voltages can be provided by DC-to-DC converters. DC-to-DC converters generally rely upon the storage characteristics of inductors and capacitors while alternately switching the applied DC voltage between the storage network and a ground potential. Thus, a converted DC voltage is generally a sawtooth waveform, first charging towards the applied DC voltage, then discharging towards ground. The sawtooth waveform is then filtered to provide a substantially ripple free DC voltage.

Typical DC-to-DC converters include SEPIC, Buck, Boost, and Flyback converters. A SEPIC converter 10 is shown in FIG. 1. In the SEPIC converter 10, a DC voltage. $V_{IN}$ is applied at an input terminal 1, and a converted DC voltage. $V_{OUT}$ appears at an output terminal 2. As shown in FIG. 1, the SEPIC converter 10 requires at least four inductors and several parallel capacitors 4 and 7 which directly contribute to size and cost. A significant drawback associated with the SEPIC converter 10 is a direct result of using power Schottky diodes 9. The power Schottky diodes 9 typically have a forward voltage of approximately 0.5 to 0.6 volts. This forward voltage substantially adversely affects a conversion efficiency of the SEPIC converter 10 since all output current passes through the power Schottky diodes 9. As power requirements increase, the power loss due to the power Schottky diodes 9 increases accordingly. Additionally, the output current at node A is a sawtooth waveform requiring adequate filtering to remove ripple from a voltage at node A. Inductor 11 and capacitor 13 filter the voltage to provide the converted DC voltage, $V_{OUT}$ at the output terminal 2. The magnitude of $V_{OUT}$ is determined primarily by the magnitude of $V_{IN}$ and the frequency at which switch 6 operates (i.e. the time switch 6 remains open relative to the time switch 6 is closed).

Demand for improved power supplies requires decreasing cost and size while improving performance. Performance, in part, can be measured by the conversion efficiency of a DC-to-DC converter, that is, how much power is lost when converting voltages. The conversion efficiency is the ratio of the output current multiplied by the output voltage and divided by the input power. Another measure of performance is determined by the amount of ripple in the converted voltage, which in turn determines the extent filtering will be required. Good performance, then, can be improved by eliminating power consuming devices (switching elements and diodes) and typically requires using large inductors and capacitors both for developing the sawtooth waveform and for adequately filtering that waveform. Larger storage components necessarily increase cost and size. Performance can also be improved by increasing the frequency of the switching element. Switching elements, however, are physically limited to the switching speeds of currently available switching devices. The problems associated with DC-to-DC converter design are further exacerbated when larger output currents are required since larger (and hence slower) switching devices are required, the power losses in conversion are potentially large, and still larger inductors are required.

Thus what is needed is a DC-to-DC converter that provides a converted voltage requiring minimal filtering while maintaining a high conversion efficiency by eliminating power Schottky diodes and increasing the switching frequency with available switching devices for high current outputs.

SUMMARY OF THE INVENTION

Accordingly, it is an object of the present invention to provide an improved DC-to-DC converter.

Another object of the present invention is to provide a DC-to-DC converter that uses an H-bridge driver to alternately energize inductors.

Yet another object of the present invention is to provide a DC-to-DC converter wherein a trapezoidal current is induced in each of two inductors due to their mutual inductance.

Still another object of the present invention is to provide a DC-to-DC converter that eliminates power loss due to power Schottky diodes.

These and other objects of this invention are accomplished by a DC-to-DC converter that converts a DC input voltage having a first magnitude into a DC output voltage having a second magnitude, wherein the DC-to-DC converter uses no power Schottky diodes. A first switch is coupled to a first inductor for alternately coupling the first inductor between the input voltage and ground potential. A second switch is coupled to a second inductor for alternately coupling the second inductor between the input voltage and ground potential. The first and second inductors are both coupled to an output terminal for providing the converted DC voltage thereto. The timing of the first and second switches is such that the first inductor is coupled to the input voltage while the second inductor is coupled to ground potential; and the first inductor is coupled to ground while the second inductor is coupled to the input voltage.

The first and second switches may be realized by use of an H-bridge driver. Output current passing through the H-bridge driver experiences only small losses due to the low RDSON (resistance from source to drain with the channel in the conducting state) of transistors making up the H-bridge driver. Losses due to the use of power Schottky diodes is thus eliminated. Additionally, the use of dual switches allows for effectively doubling the operating frequency since each switch is alternately open and closed. This further reduces the size of the required inductors since output current is divided between the two inductors. Ripple at the output voltage is also reduced since the two currents are added out of phase which further reduces the need for filtering. The H-driver DC-to-DC converter thus provides better performance with a reduced number of components.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
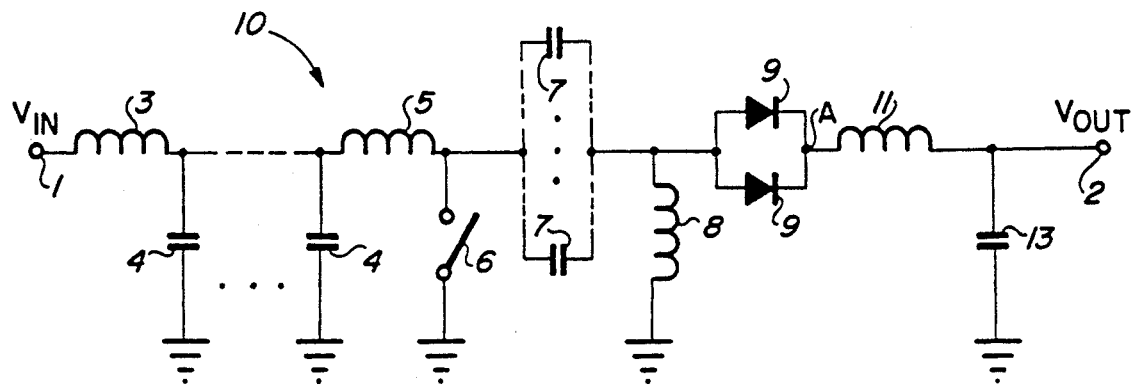
FIG. 1 is a schematic diagram of a prior art SEPIC DC-to-DC converter.
Figure 2:
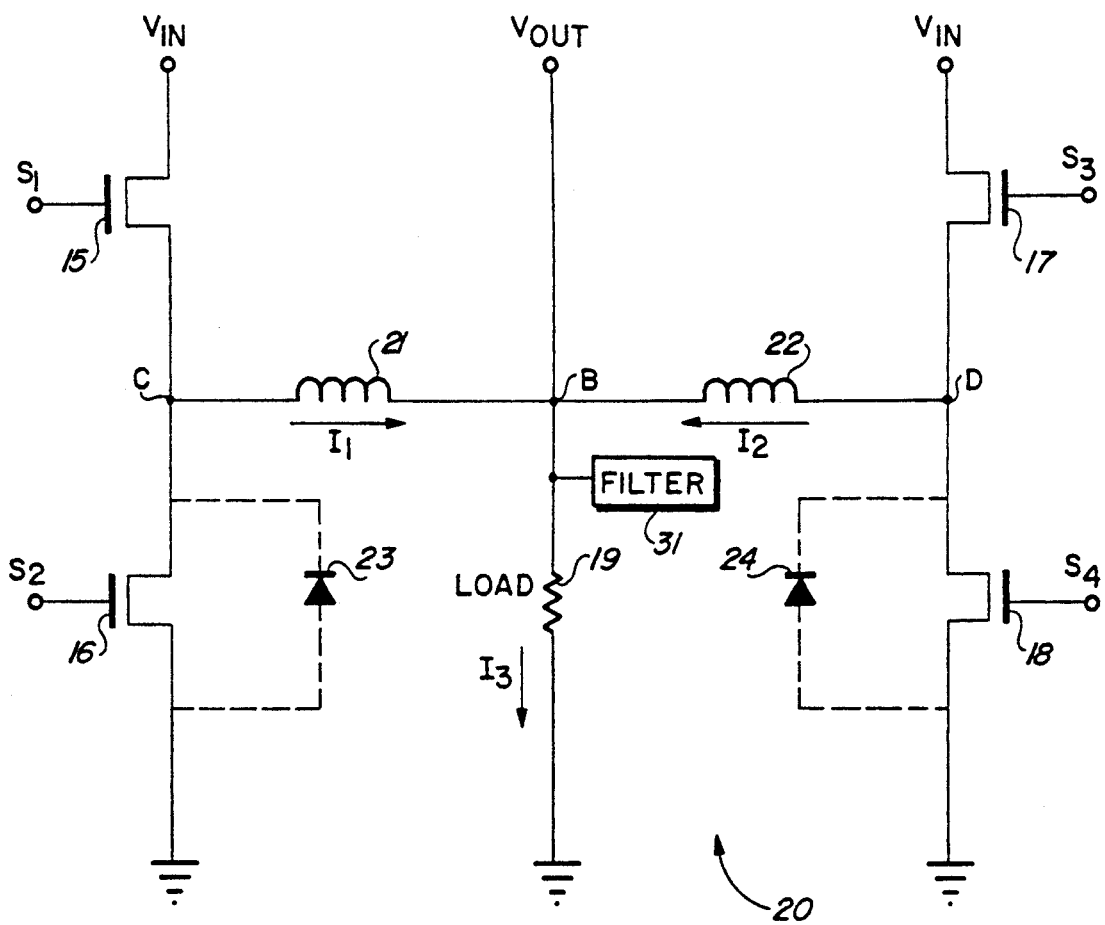
FIG. 2 is a schematic diagram of an H-Driver DC-to-DC converter.

Devices common to the several figures are denoted by primed numbers. FIG. 2 is a schematic diagram of an H-driver DC-to-DC converter 20 which uses an H-bridge, made up of transistors 15–18, as a switching device. H-bridge drivers, as is well known to those skilled in the art, are very useful in high power consumption circuits. i.e., motor drivers. H-bridge drivers are desirable for the low RDSON (resistance from source to drain with the channel biased on) characteristics. Having a low RDSON enables the H-bridge driver's transistors to be in series with a load for controlling and providing high currents thereto with minimal power loss. The transistors 15–18, are typically vertical metal oxide semiconductor (VMOS) or lateral drain metal oxide semiconductor (LDMOS) transistors. An additional advantage of using VMOS or LDMOS transistors is that very little current is required at the gates to control large currents flowing from drain to source, hence circuit efficiency is high.

Referring again to FIG. 2, the H-driver DC-to-DC converter 20 converts a DC voltage. $V_{IN}$ having a magnitude, for example, equal to 20 volts, to an output voltage. $V_{OUT}$ having a magnitude, for example, equal to 5 volts. Transistor 15 has a source connected to $V_{IN}$, a gate connected for receiving a switching signal $S_1$ and a drain connected to a node C. Transistor 16 has a drain connected to the node C, a gate connected for receiving a switching signal $S_2$ and a source connected to a ground potential (reference). Transistor 17 has a source connected to $V_{IN}$, a gate connected for receiving a switching signal $S_3$ and a drain connected to a node D. Transistor 18 has a drain connected to the node D. a gate connected for receiving a switching signal $S_4$ and a source connected to ground potential. Diodes 23 and 24 are body diodes of the transistors 16 and 18, respectively. An inductor 21 is coupled between the node C and a node B. and an inductor 22 is coupled between the nodes B and D. A load, represented by a resistor 19, is coupled between the node B and ground potential. $V_{OUT}$ is measured at the node B.

In operation, the transistor 15 is biased on by the signal $S_1$ thereby allowing a current $I_1$ to flow through the inductor 21 to the load 19. Having a portion of the current $I_1$ stored in the inductor 21, the transistor 15 is turned off and the transistor 16 is biased on by the signal $S_2$ for discharging the portion of the current $I_1$ to ground potential. Before the inductor 21 is fully discharged, the transistor 17 is biased on by the signal $S_3$ causing a current $I_2$ to flow through the inductor 22 and into the load 19. A portion of the current $I_2$ is stored in the inductor 22 and the transistor 17 is turned off. The transistor 18 is then biased on by the signal $S_4$ to discharge the portion of the current $I_2$ to ground potential. The magnitude of $V_{OUT}$ relative to the magnitude of $V_{IN}$ can be controlled by controlling the duty cycle of the transistors 15 and 17.

Figure 3:
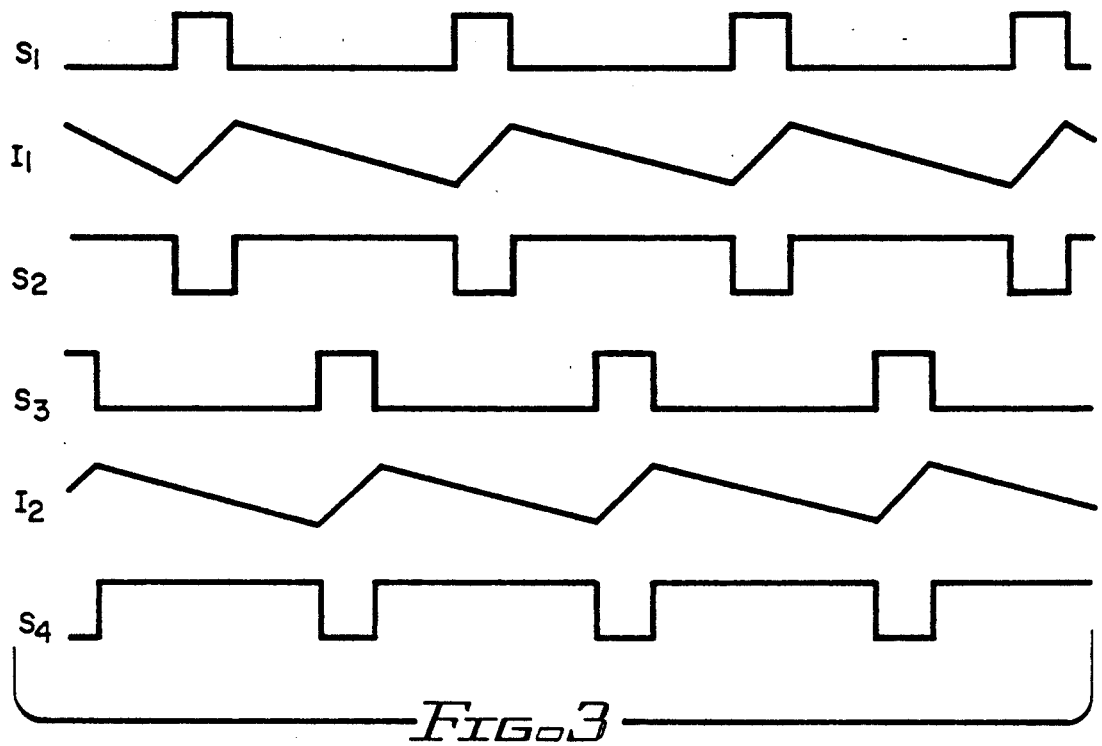
FIG. 3 is a waveform diagram of the switching signals applied to the DC-to-DC converter as shown in FIG. 2, and the resulting inductor currents.

Referring now to FIG. 3, the relative timing of the switching signals $S_1$–$S_4$ is shown as well as the currents $I_1$ and $I_2$. The signals $S_1$ and $S_2$ are 180 degrees out of phase while the signals $S_3$ and $S_4$ are 180 degrees out of phase. The currents $I_1$ and $I_2$ are sawtooth waveforms having their peaks 180 degrees out of phase. This assumes that a mutual inductance between the inductors 22 and 23 has a coupling coefficient substantially equal to zero. Using two switching devices. i.e., transistors 15 and 17, to supply $V_{OUT}$ allows the effective switching speed to be doubled over that used in the SEPIC DC-to-DC converter 10. Increasing the switching speed acts to decrease the ripple in $V_{OUT}$ and hence reduces the need for output filtering. Also, each inductor 22 and 23 need only carry half the current required of a single inductor and the current flowing in each switching transistor 15 and 17 is similarly reduced.

Figure 4:
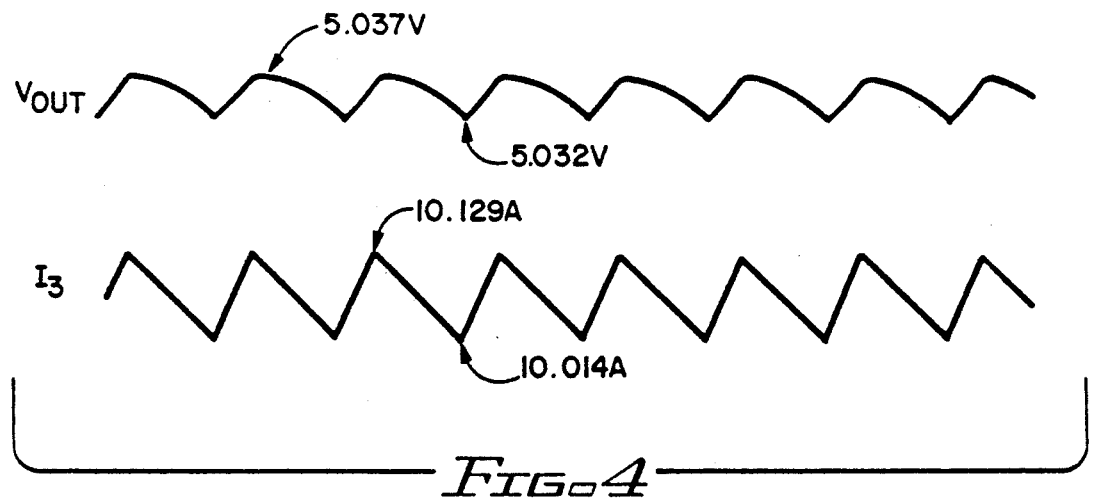
FIG. 4 is a waveform diagram of the output voltage and current of FIG. 2.

FIG. 4 depicts the voltage waveform of $V_{OUT}$ and the load current waveform of $I_3$. The ripple present in $V_{OUT}$ is only 5 milli-volts (from 5.037 volts to 5.032 volts) which would require little or no filtering. The load current $I_3$ is shaped like a triangular wave having 115 milli-amps of ripple. Very importantly, the conversion efficiency of the H-driver DC-to-DC converter 20 is substantially improved over that of the SEPIC DC-to-DC converter 10 since the load current $I_3$ is not required to flow through any power Schottky diodes. Instead, the load current is the sum of the currents $I_1$ and $I_2$ which flow through the transistors 15 and 17, respectively. The low RDSON associated with the transistors 15 and 17 allow for efficient conversion. The RDSON of the transistors 15 and 17 may be further reduced, as is known by those skilled in the art, by using a charge pump circuit (not shown) to overdrive the switching signals $S_1$ and $S_3$.

Figure 5:
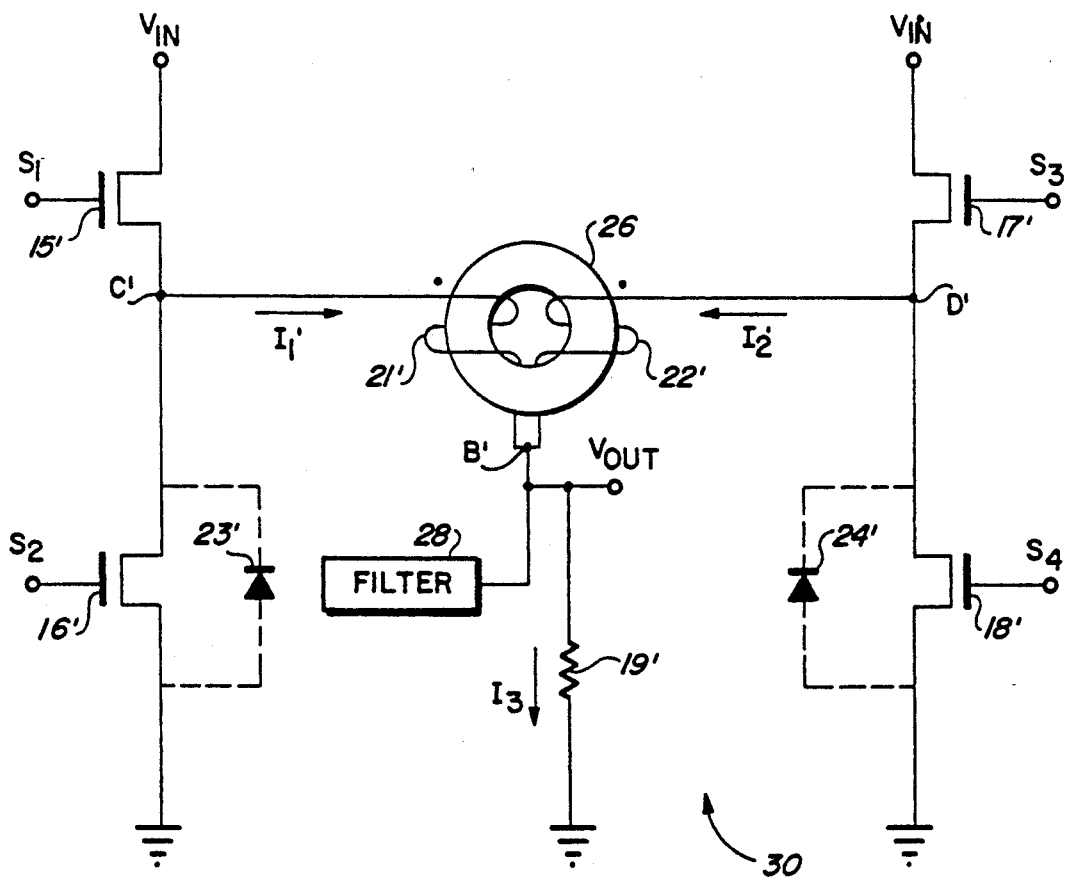
FIG. 5 is an H-Driver DC-to-DC converter according to the preferred embodiment of the present invention.

Further improvements in the output voltage may be realized by arranging the inductors 21 and 22 such that there is a mutual inductance therebetween. An H-Driver DC-to-DC converter 30 incorporating such mutual inductance is shown in FIG. 5. The H-driver DC-to-DC converter 30 is connected identically as the H-driver DC-to-DC converter 20 with the exception that a magnetic core 26 is provided about which inductors 21' and 22' are wound. The timing of the signals $S_1$–$S_4$ remains the same as that described with respect to FIG. 3. The mutual inductance of the inductors 21' and 22' has a coupling coefficient substantially equal to 0.88 in the preferred embodiment. The coupling co-efficient, however, is not critical and may be varied from approximately 0.7 to 0.9 with good results. However, a still lower coupling coefficient, for example, 0.5, may provide suitable results. Increasing the coupling coefficient too high, for example, to 0.99, causes unacceptably large swings in the currents I'₁ and I'₂.

Figure 6:
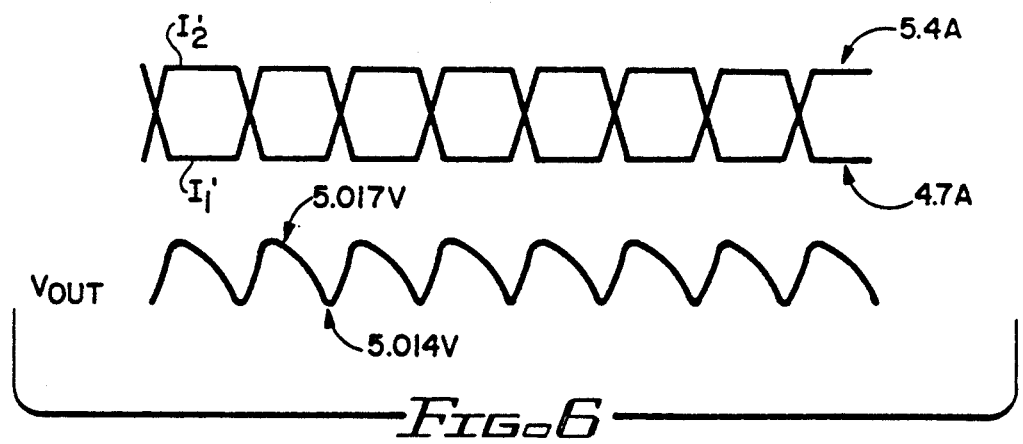
FIG. 6 is a waveform diagram of the inductor currents generated in the DC-to-DC converter of FIG. 5 and the resulting output voltage.

By incorporating mutual inductance into the H-driver DC-to-DC converter 30, the currents I'₁ and I'₂ are transformed from sawtooth waveforms to trapezoidal waveforms as shown in FIG. 6. The trapezoidal waveforms provide an improved $V_{OUT}$ waveform, that is, there is less ripple. $V_{OUT}$ ripple in this instance, is reduced to only 3 milli-volts. The magnitudes of the current swings produced by the currents I'₁ and I'₂ are larger, approximately 1.3 amps in this case. This does not have an adverse impact on the operation of the H-driver DC-to-DC converter 30 since the output current is the sum of I'₁ and I'₂. Importantly, the inductors 21' and 22' are wound in the same direction. If the direction of one inductor is reversed (so that the inductors 21' and 22' are wound in opposite directions) the results are adversely affected in that the current I'₁ and I'₂ are no longer trapezoidal causing the output ripple to increase slightly.

Utilizing an H-bridge driver in a DC-to-DC converter substantially improves performance since power Schottky diodes are eliminated and the switching frequency is increased. Additionally, fewer and smaller storage components are required while the need to filter the output voltage is reduced. By utilizing the effects of mutual inductance between the inductors 21' and 22', performance is improved still further by generating trapezoidal currents which further reduce output ripple.

While the invention has been particularly described with reference to particular embodiments thereof, it will be understood by those skilled in the art that various other changes in detail may be made therein without departing from the spirit, scope, and teaching of the invention. For example only two switching elements have been shown, but it would be possible to use a greater number of such switching elements Furthermore, switching devices other than field effect transistors could be incorporated.

Accordingly, the invention herein disclosed is to be limited only as specified in the following claims.

What is claimed is:

1. A DC-to-DC converter for converting an input voltage having a first magnitude into an output voltage having a second magnitude, the output voltage being made available to a load, the DC-to-DC converter comprising:
   a first inductor storage means for providing a first current to the load;
   a second inductor storage means for providing a second current to the load;
   means for alternately coupling and decoupling the first and second inductor storage means to the input voltage such that the first and second inductor storage means alternately charge and discharge the first and second currents, respectively, ad wherein a mutual inductance between said first and second inductor storage means has a coupling coefficient greater than 0.5.

2. The DC-to-DC converter according to claim 1 wherein the means for alternately coupling is an H-bridge driver.

3. A DC-to-DC converter for providing a converted voltage to an output terminal, the DC-to-DC converter comprising:
   an H-bridge driver having first, second, third and fourth switching means, said first switching means is a transistor coupled to an input voltage and coupled for receiving a first control signal, said second switching means is a transistor coupled for receiving a second control signal, the second control signal controlling the second switching means for operating substantially 180 degrees out of phase with the first switching means, said third switching means is a transistor coupled to the input voltage and coupled for receiving a third control signal, the third control signal controlling the third switching means such that third switching means is biased open when the first switching means is biased closed and the third switching means is biased closed when the first switching means is biased open, said fourth switching means is a transistor coupled between the third switching means and the reference voltage and coupled for receiving a fourth control signal, the fourth control signal controlling the fourth switching means for operating substantially 180 degrees out of phase with the third switching means;
   first inductor storage means coupled between the first and second switching means and the output terminal for providing a first current to the output terminal; and
   second inductor storage means coupled between the third and fourth switching means and the output terminal for proving a second current to the output terminal;
   wherein a mutual inductance between the first and second inductor storage means has a coupling coefficient greater than 0.5.

4. A DC-to-DC converter for converting an input voltage having a first magnitude into an output voltage having a second magnitude, comprising:
   transformer means having first and second windings wound about a common core such that a mutual inductance exists between the first and second windings, the first and second windings coupled for providing the output voltage;
   first switching means coupled for switching the first winding between the input voltage and a reference voltage; and
   second switching means coupled for switching the second winding between the input voltage and the reference voltage such that the first winding is coupled to the input voltage while the second winding is coupled to the reference voltage and the first winding is coupled to the reference voltage while the second winding is coupled to the input voltage.

5. The DC-to-DC converter according to claim 4 wherein the first and second switching means are first and second legs, respectively, of an H-bridge driver.

6. The DC-to-DC converter according to claim 5 wherein first and second currents flowing through the first and second windings, respectively, are trapezoidal waveforms 180 degrees out of phase.

7. The DC-to-DC converter according to claim 6 wherein the mutual inductance has a coupling coefficient greater than 0.5.

8. The DC-to-DC converter according to claim 7 further comprising a filter coupled for reducing ripple in the output voltage.

* * * * *